United States Patent [19]

Kinzenbaw

[11] Patent Number: 4,526,235
[45] Date of Patent: Jul. 2, 1985

[54] AGRICULTURAL ROW MARKER

[75] Inventor: Jon E. Kinzenbaw, Williamsburg, Iowa

[73] Assignee: Kinze Manufacturing, Inc., Williamsburg, Iowa

[21] Appl. No.: 424,382

[22] Filed: Sep. 27, 1982

[51] Int. Cl.³ .............................................. A01B 17/00
[52] U.S. Cl. ..................................... 172/126; 172/456
[58] Field of Search ............... 172/126, 127, 128, 129, 172/130, 131, 132, 311, 456

[56] References Cited

U.S. PATENT DOCUMENTS

| | | | |
|---|---|---|---|
| 3,158,204 | 11/1964 | Martin | 172/126 |
| 3,797,580 | 3/1974 | Roth | 172/311 |
| 3,944,001 | 3/1976 | Warner | 172/456 |
| 4,050,523 | 9/1977 | Poland | 172/311 |
| 4,207,950 | 6/1980 | Kinzenbaw | 172/456 |
| 4,281,720 | 8/1981 | Tusing | 172/126 X |
| 4,320,805 | 3/1982 | Winter | 172/456 |
| 4,328,869 | 5/1982 | Perelli | 172/311 |
| 4,336,846 | 6/1982 | Boetto | 172/311 |
| 4,355,690 | 10/1982 | Jensen | 172/456 |

Primary Examiner—Richard J. Johnson
Attorney, Agent, or Firm—Emrich & Dithmar

[57] ABSTRACT

A folding marker arm for an agricultural implement includes a swing link and a single hydraulic cylinder pivotally connected between the frame and the swing link. A push/pull link is mounted between the swing link and the marker arm. As the cylinder extends to rotate said marker toward the storage position and the marker arm passes through top dead center the design decelerates the marker arm as it approaches the storage position to avoid having the marker arm slam into the frame.

2 Claims, 7 Drawing Figures

AGRICULTURAL ROW MARKER

BACKGROUND AND SUMMARY

The present invention relates to an agricultural row marker. A row marker is a device which is used with a row crop planter and extends to the side of the planter to mark the center of the next swath to be planted. For example, in the case of an 8-row planter, and assuming that the land to the left of the tractor operator has already been planted, while the farmer is planting a swath of eight rows, a marker is extended to the right of the planter to provide a small furrow marking the center of the next swath to the planted. When the farmer has planted the current swath, he sights on the furrow previously marked and centers his tractor on it when planting the next swath.

As tractors and planting equipment have gotten larger through modern technology and a desire to plant crops faster, so have the length of marker arms become greater. Typically, a marker will have two separate sections pivoted in the middle which extend and are generally aligned in the unfolded or use position, but which fold when not in use and are stored above the mounting bar of the planting frame. These markers can be quite heavy, and they are normally actuated between the use and storage positions by means of an hydraulic cylinder.

During a folding sequence, as the weight of the marker passes over top dead center, there is a tendency for it to fall slightly as the force on the cylinder rod changes from compression to tension. With the weight of the marker arm added to the extension force of the cylinder, as the marker arm approaches the storage position, there is a tendency for it to slam against its rest or stop. Not only is the noise undesirable on the part of the farmer, but depending upon the size and weight of the marker arm and the resulting closing force, the marker arm could be bent or damaged after a number of closing sequences have been encountered. It is thus a primary objective of the present invention to provide an agricultural row marker which decelerates as it approaches the storage position to avoid slamming the marker arm against its rest or stop.

In order to accomplish this, the present invention provides a swing link which is pivotally mounted to the planter frame mount, and which guides the rod end of the hydraulic cylinder about the pivotal connection between the base of the marker arm and the frame. A second link, sometimes referred to as a "push/pull" link, has one end connected to the swing link adjacent the cylinder rod, and the other end pivotally connected to the base of the marker arm.

With the hydraulic cylinder retracted, the push/pull link is generally aligned with the axis of the cylinder and is pushed by it, and in turn pushes the base of the marker arm about its pivotal connection to the frame. During the initial extension motion of the hydraulic cylinder, equal increments of elongation of the cylinder cause generally equal angular displacements or rotation of the marker arm. This is desirable in order to have a rapid motion in lifting the marker arm as well as in placing it near the ground at the end of a sequence extending it to the use position.

As the marker arm passes over top dead center toward the storage position, the push/pull link is placed in tension, holding the marker arm against its weight. The swing link continues to guide both the rod end of the cylinder and the push/pull link.

As the the marker arm approaches the storage position, the push/pull link is rotated to a position such that equal increments of extension of the cylinder cause progressively smaller increments of angular displacement of the marker arm, thereby causing the marker arm to decelerate as the cylinder reaches the end of an extension sequence. This action prevents slamming of the marker arm against its stop or rest, and avoids the above mentioned disadvantages that would otherwise occur if the slamming action were not avoided.

Other features and advantages of the present invention will be apparent to persons skilled in the art from the following detailed description of a preferred embodiment where identical reference numerals will refer to like parts in the various views.

THE DRAWING

DETAILED DESCRIPTION

As used herein, the terms left and right refer to the left and right sides respectively looking in the direction of travel of the tractor. Thus, in FIG. 1, the left side section of the frame of a planter is seen from the front and generally designated 10. The frame 10 includes support wheels 11 and an elongated transverse bar of tubular metal which is designated 12. A complete planter would, of course, include planter row units, but they have been omitted for clarity.

Figure 4:
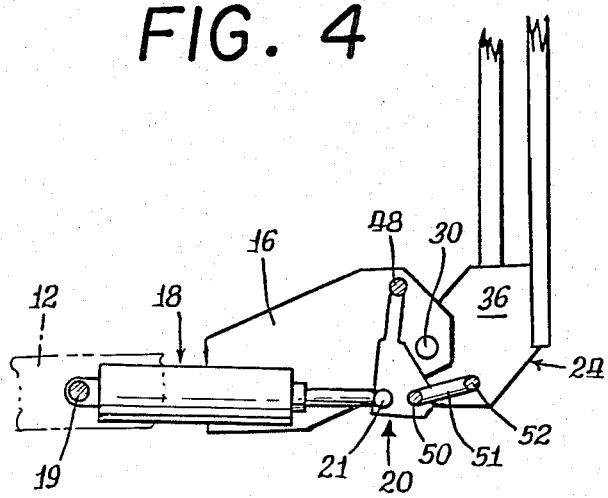

A row marker generally designated 14 is mounted to the distal end of the bar 12 by means of a forward plate 15 and a rear plate 16 (see FIG. 4).

The plates 15, 16 are rigidly mounted to the bar 12 as by welding or bolting so as to become an integral part of the planter frame.

An hydraulic cylinder generally designated 18 has its butt end pivotally mounted at 19 to the bar 12. The rod end of the cylinder 18 is mounted to a link referred to as a "swing" link designated 20 by means of a pivot 21.

The marker 14 includes a folding arm which may be of conventional design. In the illustrated embodiment, the marker arm includes an inner section 23 secured to a marker base generally designated 24, and an outer section 25. The inner and outer arms of the marker are pivotally connected at 26. A chain 27 is connected between a fixed mount 28 and a crank or linkage generally designated 29 which, in turn, is attached to the outer marker arm 25.

Figure 1:
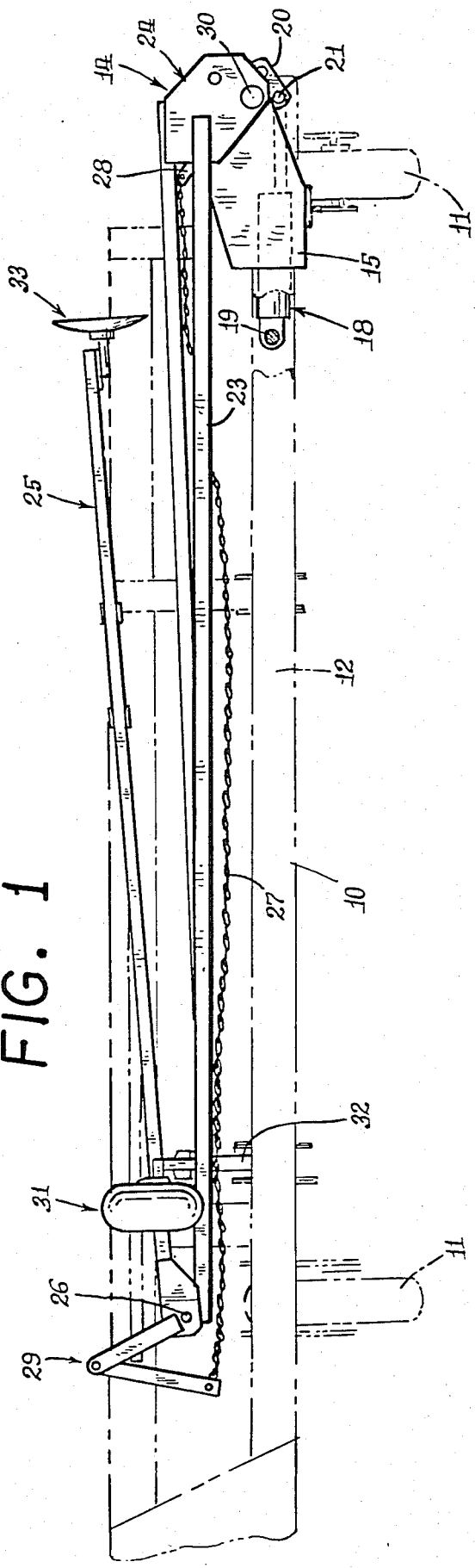
FIG. 1 is a front elevational view of a marker arm constructed according to the present invention with a fragment of the planter frame shown in phantom.
Figure 3:
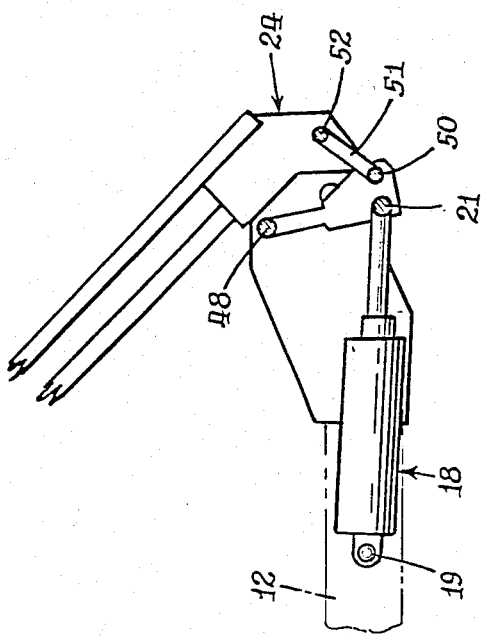
FIGS. 2-6 are front views of the extension and decelerating mechanism for moving the marker of FIG. 1 between the storage position and the use position, with portions of the structure removed for a clear view of the mechanism, and showing the mechanism in various stages of extension or retraction.

The marker arm is seen in FIG. 1 in the folded or storage position in which it is located above the bar 12 of the planter frame. To place the marker arm in the use position, as will be further understood from subsequent description, the cylinder 18 is retracted, and the base 24 and inner arm 23 are rotated clockwise about a pivot connection 30 between the marker base 24 and the plates 15, 16. As the inner arm 23 is thus rotated counterclockwise, a position will be reached at which the chain 27 will be tensioned and cause the linkage 29 to crank the outer arm 25 counterclockwise about the pivot 26 and thus open the marker arm.

A support wheel generally designated 31 is mounted to the bottom of the inner marker arm 23 and engages the ground when the marker arm is unfolded to the use position for support. In the storage position, the marker is supported by a stop 32 welded to the frame. The distal end of the outer marker arm 25 is provided with a marker disc 33 which is bearing-mounted so as to rotate in use and form the marker furrow to guide the farmer.

Figure 7:
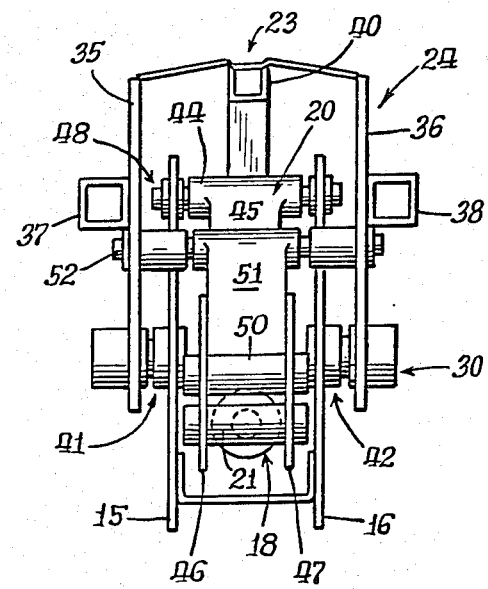
FIG. 7 is an end view of the decelerating mechanism as seen from the right side of FIG. 2.
Figure 5:
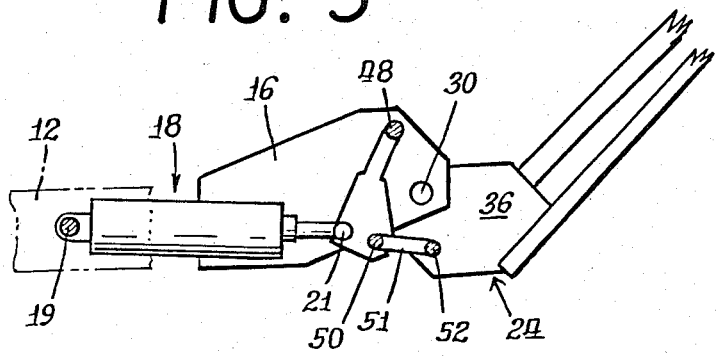

As best seen in FIG. 7, the marker base 24 includes first and second side plates 35, 36. The plate 35 is located slightly in front of the previously described mounting plate 15; and the plate 36 is located slightly behind the previously described mounting plate 16. Again, as used herein, the terms "front" and "rear" refer to the direction of travel of the tractor, "front" being in the forward direction of travel.

The inner marker arm is seen to include rectangular tubular members 37, 38 welded to the plates 35, 36 respectively, and a third tubular member 40 connected at its inner end to the base 24 and at its outer end to the tubes 37, 38.

It will be observed from FIG. 7 that the pivot connection 30 takes the form of a first pivot connection 41 between the plates 15 and 35, and a second pivot connection 42 between the plates 36 and 16.

Still referring to FIG. 7, the swing link 20 includes an upper tubular portion 44 from which depends a central portion 45. A pair of plates 46, 47 are welded to the front and rear of the central portion 45, and extend to either side of it (that is, into the plane of the of FIG. 7).

The tubular portion 44 of the swing link 20 receives a pin which provides a pivotal connection 48 with the mounting plates 15, 16.

The central portion 45 of the swing link 20 extends downwardly, and as mentioned, the plates 46, 47 are welded respectively to the front and rear of that central portion 45. The plates 46, 47 provide a journal for the pin 21 which forms the pivot connection to the rod end of the cylinder 18, and they also provide a journal for a pivot connection 50 of a push/pull link 51. The other end of the link 51 is journalled about a pin 52 held by the plates 35, 36 of the marker base 24.

In order to facilitate an understanding of the subsequent description of the invention, reference will be made to FIGS. 2-6 in which the plate 35 of the marker base 24 and the plate 15 of the swing link 20 are removed, and the various pivot structures are shown somewhat diagrammatically for clarity. It will be appreciated that the base 24 of the marker arm pivots only about the pivot 30, sometimes referred to as the first pivot. The swing link 20 rotates about the pivot 48 or second pivot. The rod end of the cylinder 18 is connected to the swing link 20 at the pivot 21 or third pivot; and the push/pull link 51 is connected to the swing link 20 at pivot 50, or the fourth pivot. The other end of the push/pull link 51 is connected to the marker arm base 24 at pivot 52 or the fifth pivot.

Figure 2:
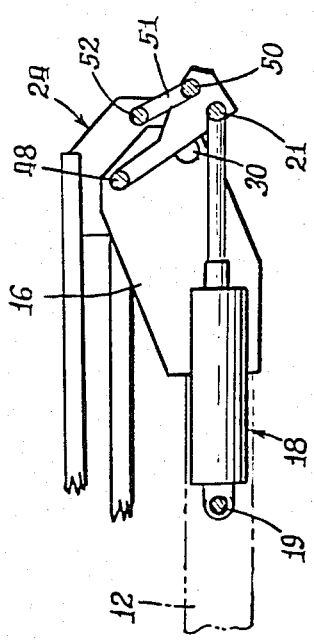
Figure 6:
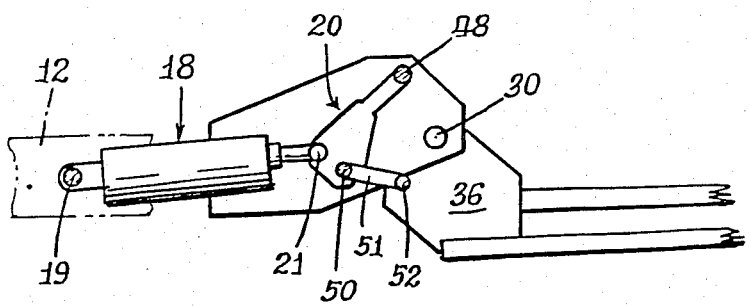

Since it is the deceleration of the marker arm as it approaches the storage position of FIG. 2 that the present invention is concerned with primarily, the drawings will be discussed starting with FIG. 6. It will be observed there that cylinder 18 is retracted, and that the marker arm base 24 permits the marker arm to be extended laterally of the frame in the use position, where the weight of the marker arm will be borne by the support wheel 31, and the disc 33 will form a furrow in the ground. When it is desired to fold the marker arm to the storage position, hydraulic fluid under pressure is forced into the butt end of the cylinder 18 causing it to extend. This causes the swing link 20 to rotate counterclockwise to the position shown in FIG. 5 during the initial phase of the folding sequence. At this time, it will be appreciated from FIG. 5 that the push/pull link 51 is in compression because the weight of the marker arm has a tendency to cause the base 24 to rotate clockwise about the first pivot (30). Further, during the sequence illustrated in FIGS. 6, 5 and 4, the push/pull link 51 is generally aligned with the axis of the cylinder 18 so that equal increments of extension of the cylinder 18 cause the marker base 24 to rotate about the first pivot 30 in equal angular displacement. In other words, if the rate of extension of the cylinder 18 is constant, then the marker arm will rotate at a constant angular velocity during the folding sequence.

As the center of gravity of the marker arm passes through top dead center (that is, a vertical plane passing through the axis of pivot 30), the push/pull link 51 will be in tension because the weight of the marker arm will have a tendency to cause it to rotate further in a counterclockwise direction. This fact, coupled with the extension of the cylinder 18 at a generally constant rate are what combine to otherwise cause the marker arm to slam into the support 32. However, as the folding sequence proceeds and the marker arm continues to rotate counterclockwise to the position of FIG. 3, it will be observed that the push/pull link 51 is no longer aligned with the axis of the cylinder 18. Further, the fourth pivot (50) is now rotated to the right of pivot 30 and continues to translate to the right as the marker arm approaches the folded position seen in FIG. 2. Because of the length of the swing link 20 and the location of the pivot points as illustrated the storage position, equal increments of extension of the cylinder 18 cause reduced increments of angular displacement of the marker arm base 24, thereby decelerating the marker arm as it comes to rest. This is accounted for, at least partially, by virtue of the fact that the swing link 20 continues to guide the third pivot (21) toward the right in FIG. 2 immediately adjacent the storage position, rather than permitting that pivot to travel upwardly (which would be the case if the rod end of the cylinder 18 were connected directly to the marker base because the marker base does rotate through approximately 180°). By use of the swing link 20, the rod end of the cylinder continues to translate toward the right in proceeding from the position of FIG. 3 to that of FIG. 2, so that at least some of the final increments of extension of the cylinder are taken up by translational movement to the right rather than rotational movement of the marker arm base 24 about the first pivot 30.

Persons skilled in the art will be able to modify certain of the structure which has been disclosed and to substitute equivalent elements for those described while continuing to practice the principle of the invention; and it is, therefore, intended that all such modifications and substitutions be covered as embraced within the spirt and scope of the appended claims.

I claim:

1. A folding marker for an agricultural implement comprising: a marker arm; frame means for mounting said arm for pivotal motion about a first pivot location such that said arm moves between a generally horizontal use position in which said arm extends laterally outwardly of said frame and a generally horiztonal storage position in which said arm extends inwardly; a swing link providing second, third and fourth spaced pivot locations; an hydraulic cylinder having one end pivotally connected to said frame means and the other end pivotally connected to said swing link at said third pivot location; means for pivotally mounting said swing link at said second pivot location to said frame means such that said third and fourth pivot locations move in a path about said first pivot location as said cylinder extends and retracts; and a push/pull link pivotally mounted at one end to said swing link at said fourth pivot location and pivotally mounted at the other end to said marker arm; whereby as said cylinder extends to rotate said marker toward the storage position and as said marker arm passes through top dead center, said push/pull link is placed in tension to support the weight of said marker arm and the angular displacement of said marker arm about said first pivot location for equal increments of extension of said hydraulic cylinder is reduced as said marker arm approaches the storage position to thereby decelerate said marker arm as it approaches the storage position.

2. The apparatus of claim 1 wherein said marker arm includes an inner arm and an outer arm pivotally connected together; and means for folding said inner and outer arms as said marker is rotated to the storage position and for unfolding said marker arm as the same is rotated to the use position.

* * * * *